US011938495B2

(12) United States Patent
Baumann et al.

(10) Patent No.: US 11,938,495 B2
(45) Date of Patent: Mar. 26, 2024

(54) DISCHARGE HEAD AND LIQUID DISPENSER COMPRISING A DISCHARGE HEAD

(71) Applicant: Aptar Radolfzell GmbH, Radolfzell (DE)

(72) Inventors: Tobias Baumann, Steisslingen (DE); Thomas Bruder, Constance (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 177 days.

(21) Appl. No.: 17/606,259

(22) PCT Filed: May 4, 2020

(86) PCT No.: PCT/EP2020/062342

§ 371 (c)(1),
(2) Date: Oct. 25, 2021

(87) PCT Pub. No.: WO2020/225223

PCT Pub. Date: Nov. 12, 2020

(65) Prior Publication Data

US 2022/0250105 A1 Aug. 11, 2022

(30) Foreign Application Priority Data

May 6, 2019 (EP) ................................. 19172799.9

(51) Int. Cl.
*B05B 11/00* (2023.01)
*B05B 11/10* (2023.01)

(52) U.S. Cl.
CPC .... *B05B 11/00442* (2018.08); *B05B 11/1033* (2023.01); *B05B 11/1035* (2023.01); *B05B 11/1046* (2023.01)

(58) Field of Classification Search
CPC ........... B05B 11/00442; B05B 11/1033; B05B 11/1035; B05B 11/1046
See application file for complete search history.

(56) References Cited

U.S. PATENT DOCUMENTS 5,014,881 A 5/1991 Andris
5,205,441 A 4/1993 Andris
(Continued)

FOREIGN PATENT DOCUMENTS

CN 201961688 * 9/2011 ........... B05B 11/035
CN 201961688 U 9/2011
(Continued)

OTHER PUBLICATIONS

Chinese Office Action with English translation issued in corresponding Chinese Application No. 202080033938.7, dated Dec. 1, 2022 (16 pages).

(Continued)

*Primary Examiner* — J C Jacyna
(74) *Attorney, Agent, or Firm* — FLYNN THIEL, P.C.

(57) ABSTRACT

A discharge head for a liquid dispenser having a base and a push actuator. The discharge head has a pump device, which has a malleable pump chamber component open on both sides, fastened to the base and to the push actuator and encloses a pump chamber having a variable volume. The pump device has inlet and outlet valves. The discharge head has a ventilation opening and a ventilation valve. The ventilation valve on the base has a peripheral valve web raised via a surrounding cover wall of the base and the inside of which forms a peripheral valve surface. To ensure a reproducible behavior of the ventilation valve, a reinforcement structure is provided on the cover wall in the form of a peripheral reinforcement web, and/or the peripheral valve web is designed as part of a sleeve-like structure, which forms the peripheral valve web above the cover wall.

7 Claims, 8 Drawing Sheets

(56) References Cited

U.S. PATENT DOCUMENTS

| | | | | |
|---|---|---|---|---|
| 5,518,147 | A * | 5/1996 | Peterson | B05B 11/1035 222/153.07 |
| 5,544,789 | A | 8/1996 | Gillingham | |
| 5,664,703 | A * | 9/1997 | Reifenberger | B05B 11/1067 222/207 |
| 11,213,843 | B2 | 1/2022 | Baumann | |
| 2010/0116849 | A1 | 5/2010 | Lautre | |
| 2017/0266680 | A1 | 9/2017 | Ophardt et al. | |
| 2021/0121904 | A1 | 4/2021 | Baumann | |

FOREIGN PATENT DOCUMENTS

| | | | | |
|---|---|---|---|---|
| DE | G 8713891.3 | U1 | 3/1989 | |
| DE | 69600697 | T2 | 2/1999 | |
| DE | 102014200155 | A1 | 7/2015 | |
| EP | 0394750 | A2 | 10/1990 | |
| EP | 0394750 | * | 4/2010 | B05B 11/1035 |
| EP | 3427839 | A1 | 1/2019 | |
| EP | 3427840 | A1 | 1/2019 | |
| FR | 2984768 | A1 | 6/2013 | |
| WO | WO2010050772 | * | 5/2010 | B05B 11/1035 |

OTHER PUBLICATIONS

International Search Report with English Translation issued in corresponding International Application No. PCT/EP2020/062342 dated Oct. 14, 2020 (12 pages).

Written Opinion of International Searching Authority issued in corresponding International Application No. PCT/EP2020/062342 dated Oct. 14, 2020 (17 pages).

English translation of Korean Office Action issued in corresponding Korean Application No. 10-2021-7039950, dated Jun. 12, 2023 (6 pages).

* cited by examiner

DISCHARGE HEAD AND LIQUID DISPENSER COMPRISING A DISCHARGE HEAD

FIELD OF APPLICATION

The invention relates to a discharge head for a liquid dispenser for discharging pharmaceutical or cosmetic liquids and a liquid dispenser which is provided with such a discharge head.

BACKGROUND OF THE INVENTION

Generic discharge heads have a deformable pump chamber component which is arranged between a base and a push actuator so that the inner volume thereof in conjunction with an inlet valve and an outlet valve forms a pump chamber whose content can be discharged by pressing down the push actuator. Generic discharge heads may in a particularly simple configuration comprise only three components since the inlet valve and the outlet valve and any ventilation valve which is present may be formed by valve lips or valve members which are provided integrally on the pump chamber component together with a counter-wall of the base or the push actuator.

EP 3427840 A1 discloses a generic dispenser which has an inlet valve, an outlet valve and a ventilation valve. However, the structural form set out therein does still leave room for improvement with regard to the ventilation of the pump chamber and in particular the ventilation of a liquid store which is coupled to the discharge head. It has been found that the ventilation valve is difficult to adjust in such a manner that the ventilation valve reliably opens at any time in the event of reduced pressure, but otherwise securely closes. If the ventilation valve does not close with balanced pressure, there is the risk of the dispenser leaking out through the ventilation valve.

SUMMARY OF THE INVENTION

An object of the invention is to develop a generic discharge head in such a manner that the discharge head demonstrates advantageous behavior when the pump chamber is ventilated during operation and for ventilating the liquid store during use.

According to a first aspect of the invention, there is proposed a discharge head which has a base and a push actuator which can be pressed down with respect to the base between an unactuated end position and an actuated end position in an actuation direction. Furthermore, the proposed discharge head has a liquid inlet for connection to a liquid store and a discharge opening for dispensing liquid in an environment. In order to convey liquid from the liquid dispenser to the discharge opening, a pump device is provided. The pump device has a deformable pump chamber component which is open at both sides and which is secured to the base and to the push actuator and which surrounds a pump chamber being variable in terms of volume and which has an inlet valve in the direction of the liquid dispenser and an outlet valve in the direction of the discharge opening.

The discharge head further has at least one ventilation opening which extends through the base and which is associated with a ventilation valve. The ventilation opening and the ventilation valve enable air to further flow into the liquid store in order to enable a pressure compensation after liquid has been removed. The ventilation valve has on the base a peripheral annular web which protrudes above a surrounding radially extending cover wall of the base and whose inner side forms a peripheral valve face for abutting a valve lip.

The peripheral valve face is provided on the base which is placed inherently or by the coupling to a liquid store into a tensioned state which can act on the valve face and which permits the reproducibility of the shaping of the valve face.

In order to ensure that the ventilation valve opens in the desired manner in the event of reduced pressure in the liquid store and is otherwise closed, two measures which can be carried out in combination are proposed.

On the one hand, it is proposed to provide a reinforcement structure on the cover wall which surrounds the annular web, at the outer side of the annular web, and which is provided at an upper side of the cover wall, preferably in the form of a peripheral reinforcement web. In the region of this reinforcement web, the cover wall is preferably at least 50% thicker than in the opposing inner and outer region of the cover wall.

In this instance, the reinforcement structure is preferably arranged opposite a region of a lower side of the cover wall, against which after the liquid store is connected a storage nozzle or bottle neck of the liquid store is in abutment. Preferably, the reinforcement structure is arranged at least partially opposite a clear cross section of the storage nozzle or bottle neck. The reinforcement structure can consequently at least partially absorb a tension which is coupled by the storage nozzle or bottle neck in the base and can consequently allow this tension not to reach the annular web and the valve lip at that location, or only to a small extent.

The second measure which is preferably provided together with the reinforcement structure involves the peripheral annular web being part of a sleeve-like structure which forms the peripheral annular web above the cover wall and which extends in alignment beyond the adjacent cover wall below the planes thereof and forms at that location a peripheral wall portion which is in alignment with the annular web.

The cover wall thus merges at the inner side into a sleeve-like form, which above the plane of the cover wall forms the annular web with the valve face and below the cover wall forms the peripheral wall portion. This wall portion preferably merges into a peripheral annular wall which is penetrated by at least one ventilation opening. The peripheral wall portion may in particular also facilitate the coupling with the liquid store and in this instance act as a guide. When the discharge head is secured to the liquid store, the wall portion preferably protrudes into the bottle neck or storage nozzle of the liquid store.

It has been found that the sleeve-like structure mentioned brings about a significant positional stabilization of the valve face. Particularly together with the reinforcement structure mentioned, it is possible for even a very significant tension state in the outer region of the base, for example, as a result of the discharge head being tightened too securely, not to negatively affect the opening properties of the ventilation valve.

According to a second aspect of the invention, a discharge head is proposed, in particular a discharge head of the type described above with an improved ventilation valve which also has the elements of the base and the push actuator which can be pressed down and the liquid inlet, the discharge opening and the pump device which is formed by a deformable pump chamber component which is open at both sides and which has an inlet valve and outlet valve.

As also described with regard to the first aspect of the invention, the discharge head has at least one ventilation opening which extends through the base and with which a ventilation valve is associated. This ventilation valve has on the base a peripheral annular web whose inner side forms a valve face. The ventilation valve further has a valve lip which is constructed integrally with the pump chamber component and which when the ventilation valve is closed is peripherally in abutment with the valve face.

In order to secure the pump chamber component to the base, the base has an inlet nozzle which forms the liquid inlet and on which a securing portion of the pump chamber component is pushed. The inlet nozzle has a support structure having at least one outwardly facing and non-peripheral support face which, at least toward the end of the pressing-down action of the push actuator, comes into touching contact with the pump chamber component and thereby results in a pressing force with which the valve lip abuts the valve face not being peripherally uniform.

The inlet nozzle is a carrier of the pump chamber component and consequently also the valve lip of the ventilation valve which is provided thereon. The support structure is provided on the outer side of the inlet nozzle and can ensure that a reduced pressure in the liquid store does not lead peripherally to a uniform action of force on the valve lip. It has been found that such a uniform action of force, on the one hand, makes opening per se more difficult and more difficult to predict, in particular when the valve lip has an expanding shape, wherein a straight line between a contact face at the distal end of the valve lip and valve lip root on the pump chamber component forms with the actuation direction an angle between 30° and 60° and thereby has a high level of inherent rigidity. On the other hand, the peripheral uniformity of the action of force may bring about a flapping at the sealing lip and consequently an undesirable generation of noise.

The non-uniformity brought about by the support structure prevents this since the non-uniformity leads to a region of the valve lip with an increased tendency toward opening. A reproducible opening without noise generation can thereby be achieved.

Although it is in principle possible to allow the support structure to reduce the tendency toward opening only in a limited peripheral region, it is considered to be advantageous for the support structure to have a plurality of support faces, preferably between 2 and 12, in particular between 4 and 8, which are distributed in a uniform manner over the periphery. Between these support faces, the regions with an increased tendency toward opening can be found.

In particular, the support structure may have a rib or a plurality of ribs whose end faces facing in the direction of the push actuator form the support faces. The ribs may at the same time bring about a partial reinforcement of the base which counteracts the deformation of the valve face of the ventilation valve mentioned in the introduction. The at least one ventilation opening may preferably be arranged peripherally between these ribs.

According to a third aspect of the invention, a discharge head is proposed, in particular a discharge head of the type described above with an improved ventilation valve which in turn has the elements of the base and the push actuator which can be pressed down and the liquid inlet, the discharge opening and the pump device which is formed by a deformable pump chamber component which is open at both sides and which has an inlet valve and an outlet valve.

The outlet valve has a peripheral annular web which projects downward from an inner end wall of the push actuator in the direction of the base and whose outer side forms a peripheral valve face. At the inner side thereof, the discharge head has an additional displacement structure which protrudes downward from the inner end face of the push actuator, wherein this displacement structure has a receiving space which is open in the direction of the pump chamber and which is laterally closed by a surrounding wall. The displacement structure is in this instance separated from the annular web, preferably by means of a peripheral recess.

The displacement structure reduces the pump chamber volume, wherein, particularly when a bellows is used as the main shaping of the pump chamber component, this reduction does not influence the usable pump chamber volume, that is to say, the quantity of liquid which can be discharged with an actuation stroke, but instead only the non-usable remaining volume of the pump chamber. In addition to the direct reduction of the pump chamber volume, the displacement structure, as a result of the receiving space formed thereby, provides a region for receiving residual air. In this, the air which can only be discharged with difficulty accumulates in the pump chamber, whereby it is ensured that the air does not reach the outlet valve or reaches the outlet valve only to a relatively small extent and does not disrupt the function thereof.

The surrounding wall of the displacement structure extends into the pump chamber, preferably projecting beyond the annular web. Whilst the annular web itself, already as a result of the shaping of the pump chamber component, in particular in the configuration thereof as a bellows, can only have a limited extent in the direction of the base, the displacement structure may extend in the actuation direction further into the pump chamber.

The pump chamber has a maximum volume $V_{PMax}$ which is defined by the inner space of the pump chamber between the inlet valve and the outlet valve when the push actuator is arranged in the non-actuated end position. The receiving space has a receiving space volume $V_A$ which is formed by that part-volume of the pump chamber which is enclosed within the surrounding wall. The relationship between the receiving space volume $V_A$ and the pump chamber volume $V_{PMax}$ is preferably between 1:50 and 1:10.

According to a fourth aspect of the invention, a discharge head is proposed, in particular a discharge head of the type described above with an improved ventilation valve, which also has the elements of the base and the push actuator which can be pressed down and the liquid inlet, the discharge opening and the pump device which is formed by a deformable pump chamber component which is open at both sides and which has an inlet valve and outlet valve. In this instance, there is provision for the discharge head to have at least one ventilation opening which extends through the base and with which there is associated a ventilation valve which has a peripheral valve lip which is formed integrally on the deformable pump chamber component and which abuts in a pretensioned state in an outward direction against a peripheral valve web of the base.

In order to protect the valve lip prior to installation in the discharge head, there is provided a protective lip which is also formed integrally on the deformable pump chamber component and which is arranged at the outer side of the valve lip in order to protect the valve lip. The protective lip in this instance protrudes beyond the valve lip preferably both radially and axially.

The purpose of the protective lip is in particular to protect the valve lip of the ventilation valve during the handling as bulk material prior to the assembly. In particular during a shaping operation of the valve lip as a conical valve lip with a shape which expands in the direction toward the contact face, the valve lip is particularly at risk. It has been found that sometimes barely visible defects as a result of direct damage and relaxation in the deformed state can influence the reproducibility of the behavior of the valve lip in a substantially unanticipated manner when the discharge head is used.

The protective lip protrudes beyond the valve lip radially and axially so that the protective lip neither in the horizontal state nor in the upright state comes into contact with a substrate. Preferably, the valve lip is recessed with respect to the protective lip in such a manner that a structurally identical pump chamber component cannot or can hardly come into contact with the valve lip.

According to a fifth aspect of the invention, there is proposed a discharge head which in a manner corresponding to the embodiments described has the mentioned elements of the base and the push actuator which can be pressed down and the liquid inlet, the discharge opening and the pump device which is formed by a deformable pump chamber component which is open at both sides and which has an inlet valve and outlet valve.

The discharge head has at least one ventilation opening which extends through the base and which is associated with a ventilation valve. This valve has a peripheral valve lip which is formed integrally on the deformable pump chamber component and which abuts in a state pretensioned in an outward direction against a peripheral valve web of the base. In this instance, there is provided a tilting member which protrudes radially over the peripheral valve lip and which is formed integrally on the pump chamber component. In a manner corresponding to this, there is provided on the push actuator a switching face which faces in the direction of the tilting member and which in the actuated end position acts with force on the tilting member and thereby lifts the valve lip of the ventilation valve from the valve web or facilitates pressure-related lifting of the valve lip from the valve web.

With such a configuration, the ventilation can be forced when the push actuator is pressed down or at least promoted in such a manner that even a small reduced pressure in the bottle is sufficient to open the ventilation valve. The mentioned tilting member, which is preferably constructed as a peripheral tilting collar, is connected integrally to the pump chamber component. In this manner, it is provided in such a manner on the pump chamber component that the sealing lip which is also integrally connected to the pump chamber component is acted on with force when the tilting member is pressed down by the push actuator.

The mentioned forced opening or simplified opening enables the ventilation valve to be configured in such a manner that the ventilation valve opens exclusively when forced to open in this manner or opens only in the event of considerable reduced pressure in the bottle. A ventilation valve which is particularly leak-proof can therefore be provided. Since the forced opening takes place when the push actuator is pressed down, that is to say, before the return stroke and the suction of liquid in the pump chamber which takes place in this instance, after the return stroke a slight reduced pressure can be produced in the liquid store but is at least temporarily equalized at the latest during the next actuation.

The invention also includes a liquid dispenser for discharging pharmaceutical or cosmetic liquids, which has a liquid store and a discharge head for conveying liquid from the liquid chamber into an environment. The discharge head is in this instance constructed in accordance with the description herein.

The liquid store is in this instance preferably a ventilated liquid store which is formed by rigid walls and which is ventilated by the ventilation opening in the discharge head so that the incoming air comes into direct contact with the liquid. Such a configuration generally has on the discharge head a riser pipe which protrudes from the base thereof into the liquid store. However, a configuration is also conceivable in which there is provided within the rigid wall of the liquid store a bag in which the liquid is stored. The ventilation is carried out in this instance not into this bag but instead into a surrounding space within the rigid wall of the liquid store. With such a bag system, depending on the configuration, a riser pipe can be dispensed with.

In the delivery state of the liquid dispenser, the liquid store is filled with a pharmaceutical or cosmetic liquid. In particular in this instance, this may be a highly viscous liquid in the form of a gel or a foam.

BRIEF DESCRIPTION OF THE DRAWINGS

Other advantages and aspects of the invention will be appreciated from the claims and the following description of preferred embodiments of the invention, which are explained below with reference to the Figures. In the drawings:

DETAILED DESCRIPTION OF THE EMBODIMENTS

Figure 1:
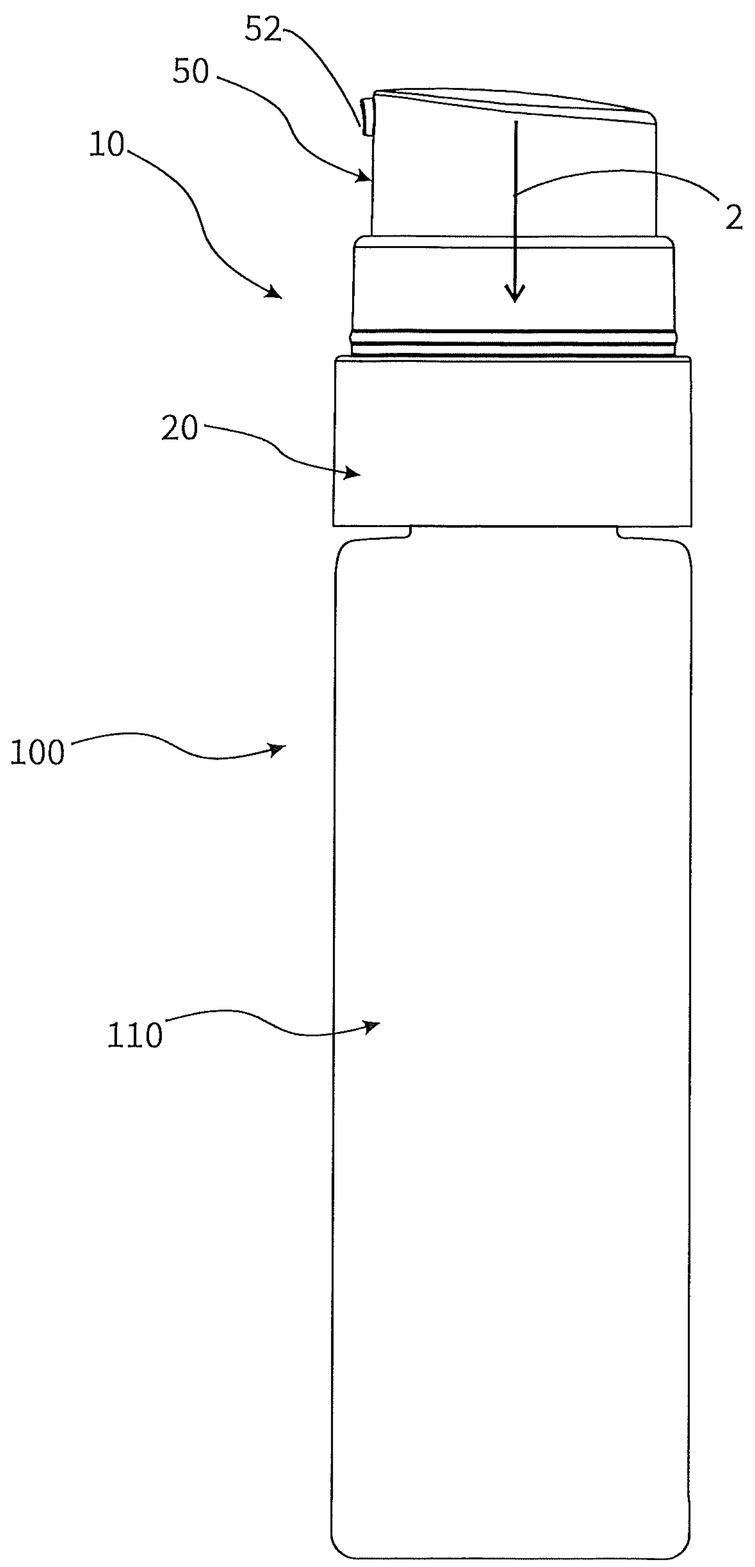
FIG. 1 is an overview of the liquid dispenser according to the invention.

FIG. 1 shows a liquid dispenser 100 for discharging pharmaceutical or cosmetic liquids, for example, for discharging a shower gel. The liquid dispenser 100 has a liquid store 110 and a discharge head 10 which is secured by a thread or another connection technique to a bottle neck or storage nozzle of the liquid store 110.

The discharge head 10 has a base 20 and a push actuator 50 which can be pressed down with respect to the base 20 in the direction of an actuation direction 2. A discharge opening 52 is provided therein. By pressing down the push actuator 50, there is actuated in the discharge head 10 a pump device 12 which conveys liquid from the liquid store 110 to the discharge opening 52.

Figure 2:
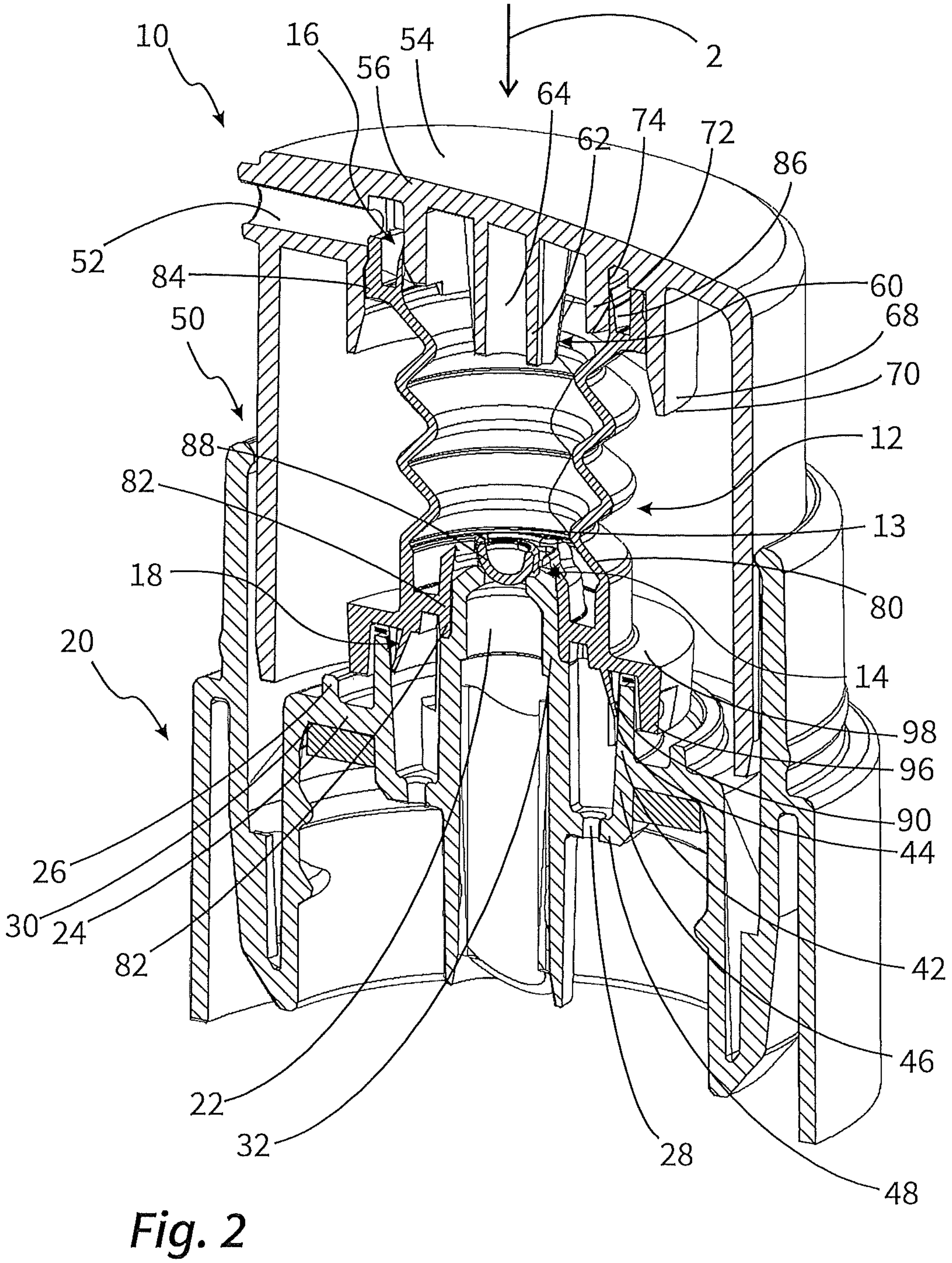
FIG. 2 is a sectioned illustration of the discharge head according to the invention of the liquid dispenser according to FIG. 1.
Figure 3:
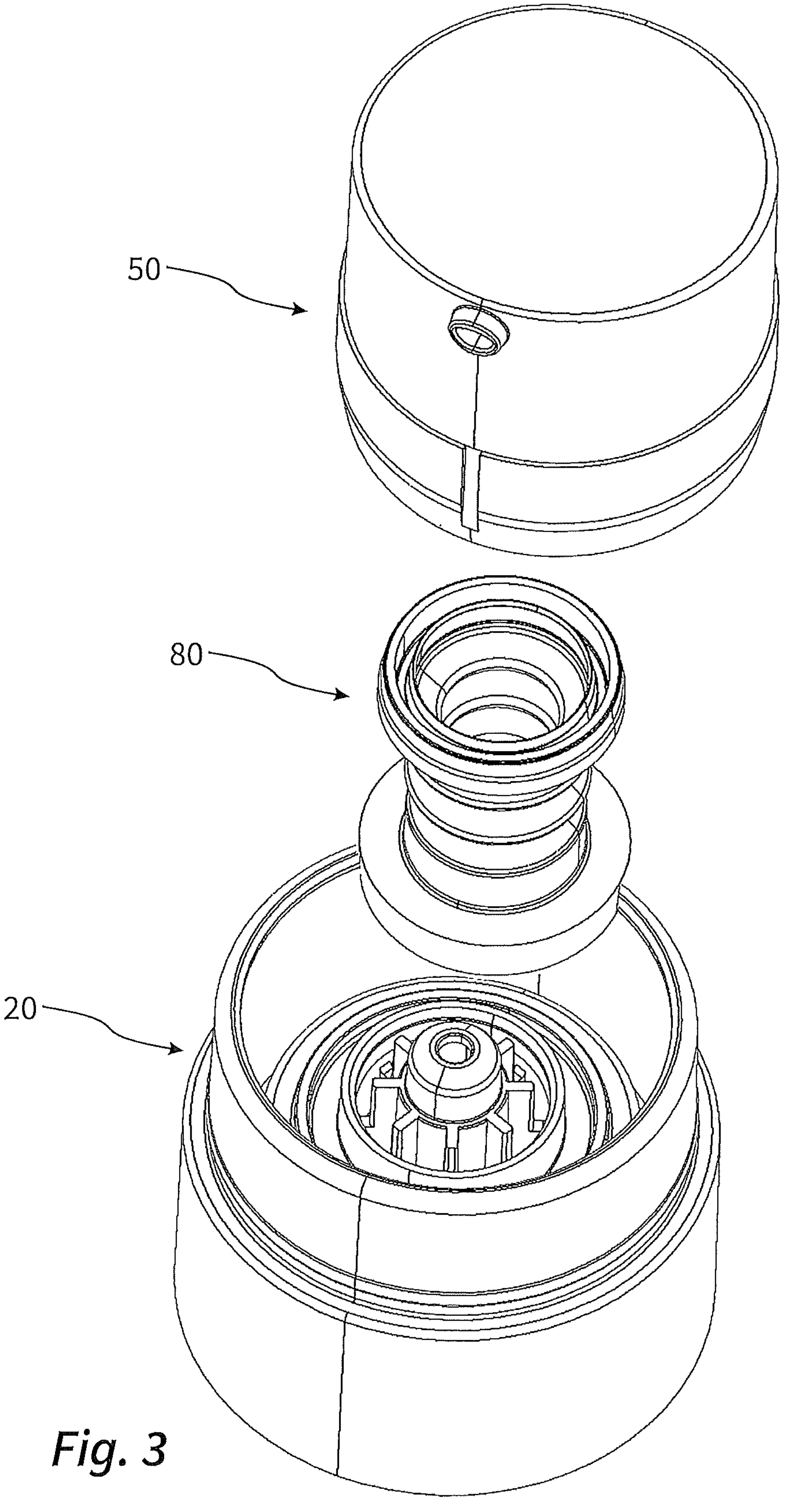
FIG. 3 is an exploded illustration of the significant components of the discharge head, FIG. 4 explains the specific structure of the base in order to ensure a reproducible opening behavior of a ventilation valve of the discharge head.

In FIG. 2, the discharge head 10 is illustrated in more detailed form. With regard to FIG. 2 and the exploded illustration of FIG. 3, the elements are explained in detail.

The main elements of the discharge head 10 are the base 20 already mentioned, the push actuator 50 and a pump chamber component 80 which is provided for securing both to the base 20 and the push actuator 50 and which provides a pump chamber wall in the form of a bellows 81. As can be seen with reference to FIG. 2, the pump chamber component

80 which is produced from a resiliently deformable plastics material is secured by a sleeve-like securing portion 82 so as to be clamped to a clamping face 40 of an inlet nozzle 32 of the base 20, wherein this inlet nozzle 32 is passed through by a liquid inlet 22. At the opposing side, the pump chamber component 80 is secured with a securing flange 84 to the push actuator 50, wherein this securing is carried out at the inner side of a peripheral securing web 68 of the push actuator 50.

Together with the base 20 and the push actuator 50, the pump chamber component 80 forms a total of three valves. An inlet valve 14 is provided at the upper end of the inlet nozzle 32. In this instance, the pump chamber component 80 has a resiliently deflectable hemispherical valve member 88 which is pressed onto the liquid inlet 22 and which opens in the event of reduced pressure in the pump chamber 13. At the opposing end, the pump chamber component 80 has a valve lip 86 which abuts at an outer side against an annular web 72 of the push actuator 50. In the event of excess pressure in the pump chamber 13, the valve lip 86 is deflected, in particular in the region of the discharge opening 52, so that liquid can flow to the discharge opening 52 and into a surrounding atmosphere.

The third valve which is formed by the pump chamber component 80 is a ventilation valve 18. This valve is formed, on the one hand, by a peripheral valve web 42 of the base 20 and the valve face 44 thereof which faces the inner side and, on the other hand, by a conically expanding valve lip 90 of the pump chamber component 80. The valve lip 90 has at a free end a contact face 94 for abutment with the valve face 44.

The ventilation valve 18 separates a surrounding atmosphere with respect to an annular space which surrounds the inlet nozzle 32 and which is connected via ventilation openings 28 to an inner space of the liquid store 110. If the pressure in the liquid store 110 and consequently also in the annular space is lower than an ambient pressure, the ventilation valve 18 opens by the valve lip 90 at least partially losing contact with the valve face 44.

The discharge of liquid is carried out by the push actuator 50 being pressed down by a force being applied to an actuation face 54 so that the bellows 81 of the pump chamber component 80 is compressed and the liquid contained therein after opening the outlet valve 16 flows outward through the discharge opening 52. If the push actuator 50 is subsequently released, the pump actuator 50 returns with return deformation of the previously resiliently tensioned pump chamber component 80 into the initial position of FIG. 2, wherein in the meantime the outlet valve 16 is closed and instead the inlet valve 14 opens so that liquid can flow from the liquid store 110 into the pump chamber 13.

So that no reduced pressure is produced in the liquid store 110 after liquid has been removed and would prevent a flow of liquid into the pump chamber 13, the ventilation valve 18 is provided. The valve 18 opens in the event of reduced pressure in the liquid store 110 by the contact face 94 at the side of the valve lip 90 opposite the valve lip root 92 lifting from the valve face 44 and consequently enabling the influx of ambient air.

Specific aspects of the discharge head 10 are explained below with reference to FIGS. 4 to 10B.

Figure 4:
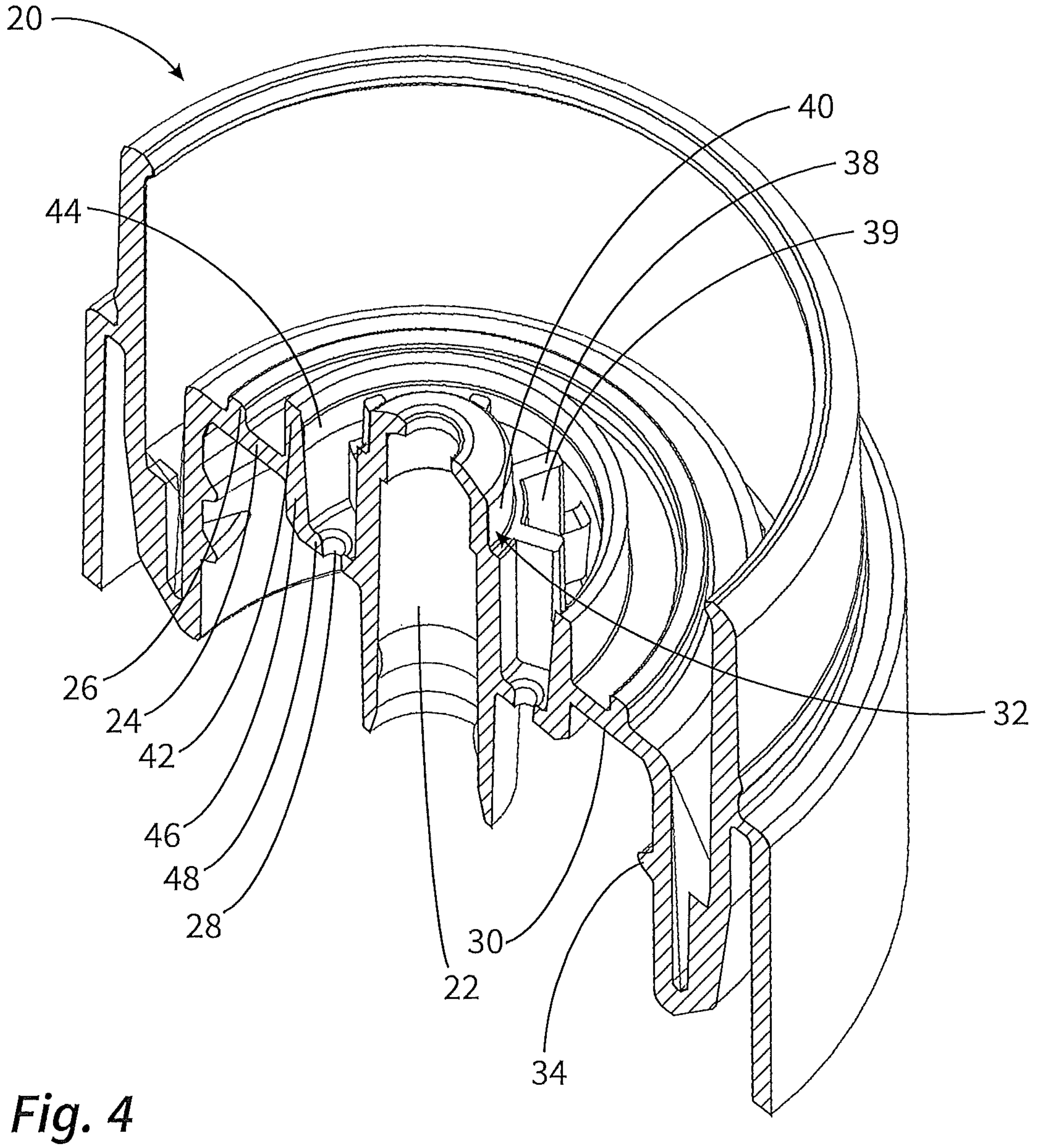

FIG. 4 shows a sectioned illustration of the base 20 in a separate illustration. There is provided on the base 20 an inner thread 34, by which the base is secured to a thread of the liquid store 110. When the discharge head 10 has been securely screwed to the liquid store 110, there is the risk of a cover wall 24 of the base 20 which spans the bottle neck of the liquid store 110 being placed in a tensioned state in a manner which impairs the opening properties of the ventilation valve 18, in particular reduces the pressing pressure of the contact face 94 of the valve lip 90 on the valve face 44 in such a manner that the ventilation valve 18 remains permanently open and liquid loss may be anticipated in this instance, or which increases the pressing pressure in such a manner that the ventilation valve 18 does not open in a reliable manner so that a reduced pressure can form in the liquid store 110.

The base of the discharge head has two measures in order to prevent such a state of tension. On the one hand, a reinforcement structure 26 in the form of a peripheral web is provided at the upper side of the cover wall 24. The web is located in a radial direction above the face against which an uppermost edge of the bottle neck is pressed when the base 20 is securely screwed to the bottle neck. It has been found that such a reinforcement brings about a decoupling so that the state of tension which is produced can reach the valve web 42 only to a small degree and can therefore deform the valve web 42 only to a small extent. The second measure involves the peripheral valve web 42 continuing to a location below the plane of the cover wall 24 and in this instance forming a peripheral wall portion 46 which is in alignment therewith. The valve web 42 and the wall portion 46 together form a sleeve-like shape. This also counteracts the deformation of the valve web 42. Even when the base 20 is incorrectly tightly screwed to the bottle neck of the liquid store 100, the behavior of the ventilation valve 18 therefore hardly changes.

Figure 5:
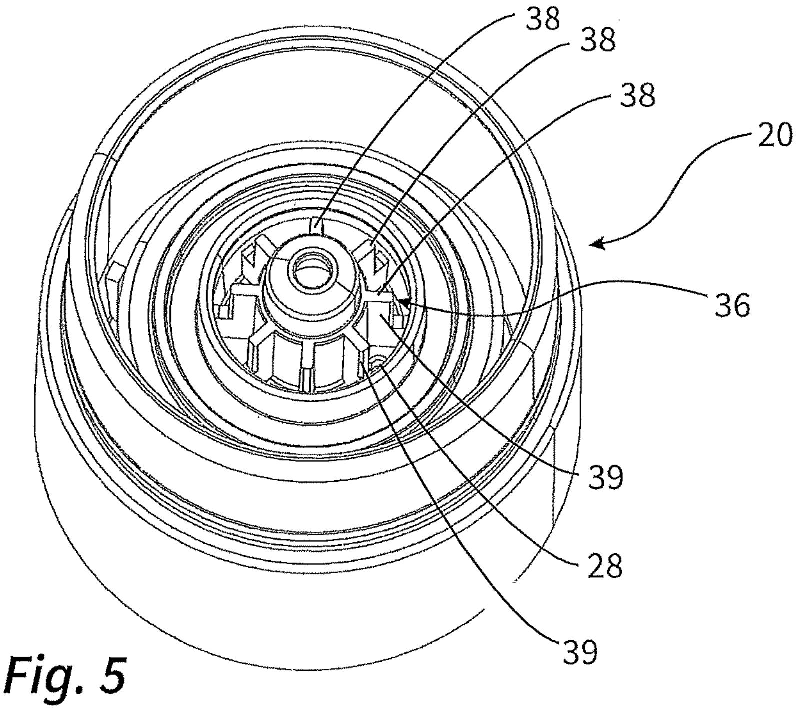
FIGS. 5 to 6B illustrate the deformation of a valve lip of the ventilation valve during the ventilation.
Figure 6A:
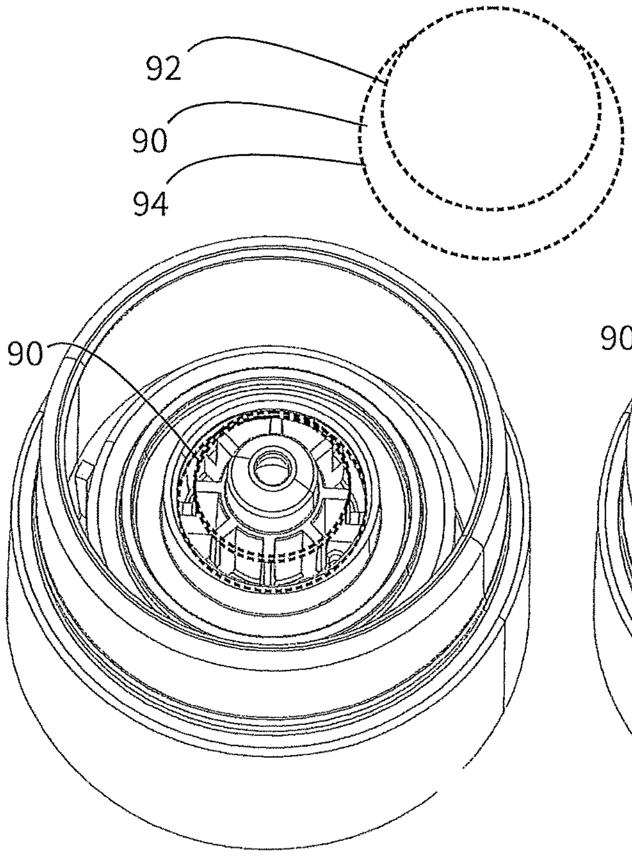
Figure 6B:
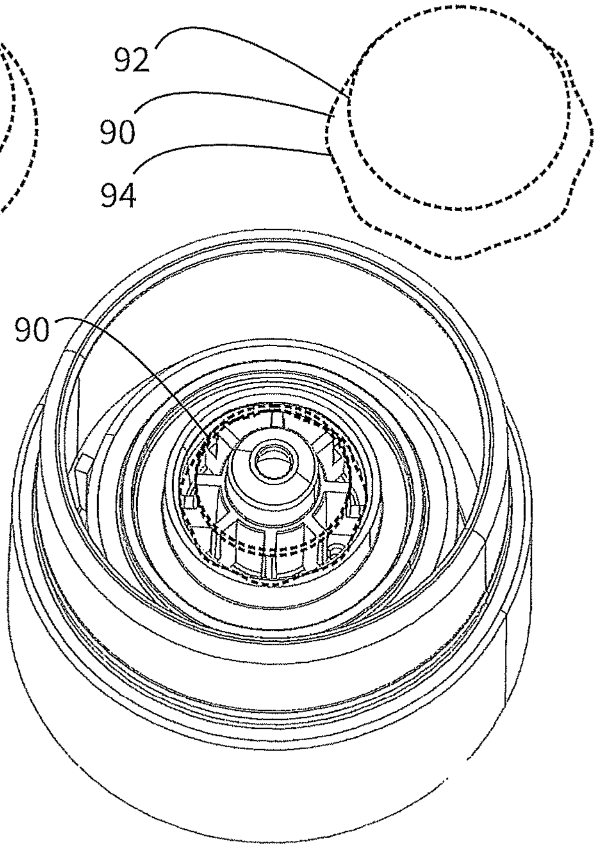

FIGS. 5A and 6A and 6B explain another aspect with regard to the ventilation valve 18. In order to enable a reliable closure of the ventilation valve, it is advantageous for the valve lip 90 of the ventilation valve 18 to have a conical shape with an expansion in the direction of the contact face 94 of the valve lip 90. However, the conical shape has the disadvantage that the valve lip 90 in order to open the ventilation valve 18 has to be subjected to a deformation during which the contact face 94 of the valve lip 90 is shortened so that the contact face 94 is released at least partially from the valve face 44 of the valve web 42.

In order to promote this deformation, there is provided in the manner illustrated in FIG. 5 at the outer side of the inlet nozzle 32 a support structure 36 with ribs 39 which in each case form support faces 38 at the upper side thereof.

The support faces 38 promote the valve opening since, in the region of the support faces 38, a deformation of the valve lip 90 is made more difficult so that at the same time, in the peripheral regions between two ribs 39 with support faces 38, the deformation of the valve lip 90 is promoted and in this instance facilitated at least with respect to the regions supported by the support faces 38.

FIGS. 6A and 6B show this, wherein the FIGS. 6A and 6B in each case show the base 20 and of the pump chamber component 80 only the valve lip 90.

FIG. 6A shows the state of the closed ventilation valve 18. The valve lip 90 is also illustrated separately again for better understanding. When the ventilation valve is closed, the contact face 94 is in abutment with the outer valve face 44 and has a rotationally symmetrical form.

If a reduced pressure is now produced in the liquid store 110, this brings about in the manner depicted in FIG. 6B a deformation of the valve lip 90 in the intermediate regions and consequently a release of the contact face 94 of the valve lip 90 in these regions. Air from the environment can consequently flow into the liquid store 110.

Figure 7:
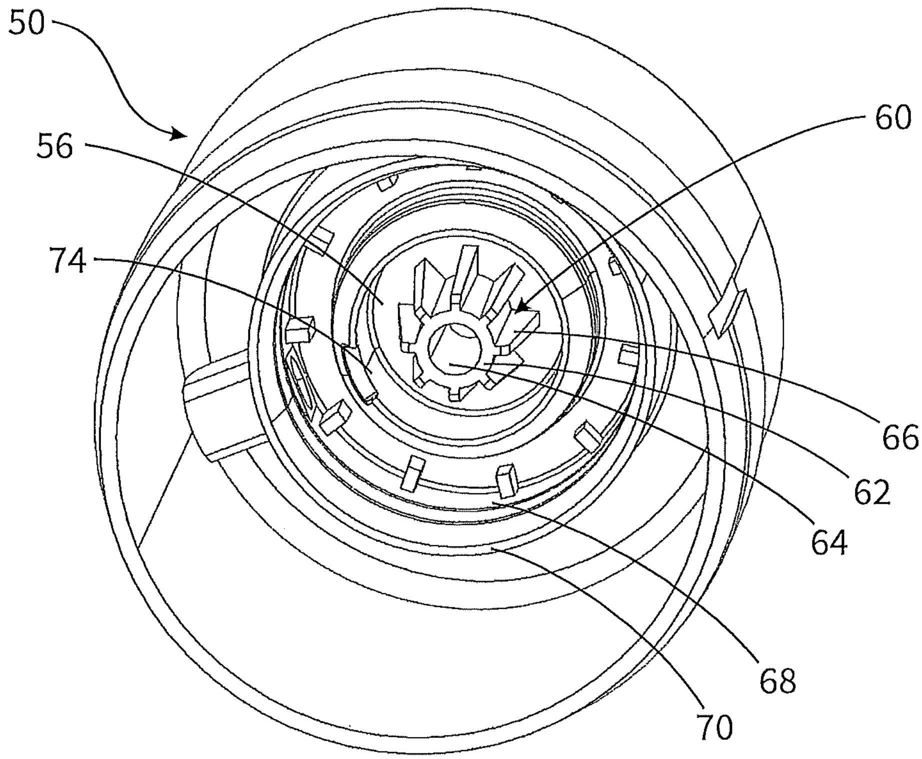
FIG. 7 shows the inner structure of the push actuator of the discharge head.

FIG. 7 shows the push actuator 50 as a separate illustration and with a perspective from below looking into the push actuator 50. It is possible to see the outer securing web 68, to the inner side of which the securing flange 84 of the pump chamber component 80 is fixed.

There is provided therein an annular web 72 whose outer face forms the valve face 74 which the valve lip 86 of the outlet valve 16 abuts in the idle state. Still therein, a displacement structure 60 is provided on the end wall 56 of the push actuator 50. The displacement structure 60 serves, on the one hand, to reduce the pump chamber volume. On the other hand, the displacement structure 60 forms with the receiving space 64 thereof, which is surrounded by a peripheral wall 62, a receiving region for residual air of the pump chamber 13. It has been found that in practice it is possible only with difficulty to completely displace the air from the pump chamber 13. Since the pump chamber volume remains comparatively large even when the push actuator 50 is pressed down, a quantity of air which is initially present in the pump chamber 13 remains during operation and whilst the dispenser is used at least partially in the pump chamber. As a result of the displacement structure 60, however, it is ensured that a considerable portion of this quantity of air reaches the receiving space 64 and remains permanently at that location. This quantity of air is thereby prevented from having a negative effect on the reproducible opening and closure of the outlet valve 16. The wall 62 of the displacement structure 60 extends into the bellows region 81 of the pump chamber component 80 and protrudes beyond the annular web 72.

Figure 8:
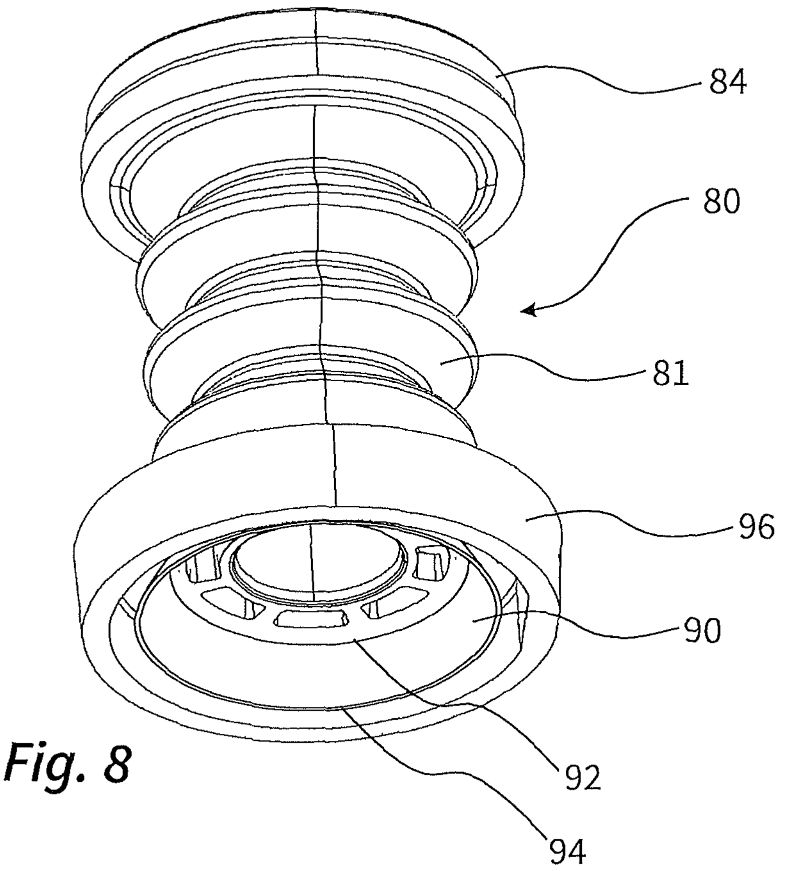
FIGS. 8 and 9 show the structure of a pump chamber component which is constructed as a bellows.
Figure 9:
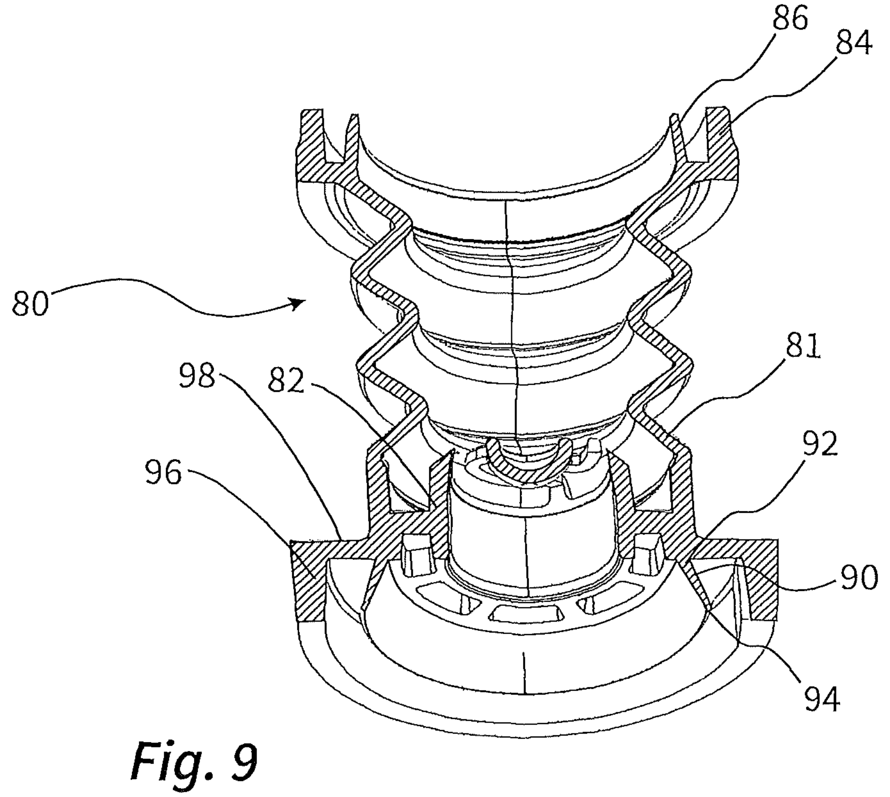

FIGS. 8 und 9 show the pump chamber component in an isolated illustration, wherein in FIG. 9 the pump chamber component is illustrated in section, whilst the pump chamber is shown in its entirety in FIG. 8.

It can be seen that the valve lip 90 which is associated with the inlet valve 14 is protected in a specific manner against damage prior to assembly. This is advantageous since the pump chamber component 80 during assembly is preferably handled as bulk material, that is to say, a large number of such pump chamber components 80 are handled together without defined orientation, for example, transported and supplied. In particular, the common storage and the common transport in a large bag with a large number of pump chamber components 80 are commonplace. The risk is very significant that in this instance damage to the contact face 94 at the distal end of the valve lip 90 may lead to the ventilation valve remaining permanently open during operation.

In order to prevent this, there is provided a protective lip 96 which is also an integral component of the pump chamber component 80 and which extends both in a radial direction and in an axial direction over the contact face 94 of the valve lip 90. The contact face 94 is consequently recessed with respect to the lower end face of the protective lip 96.

Figure 10A:
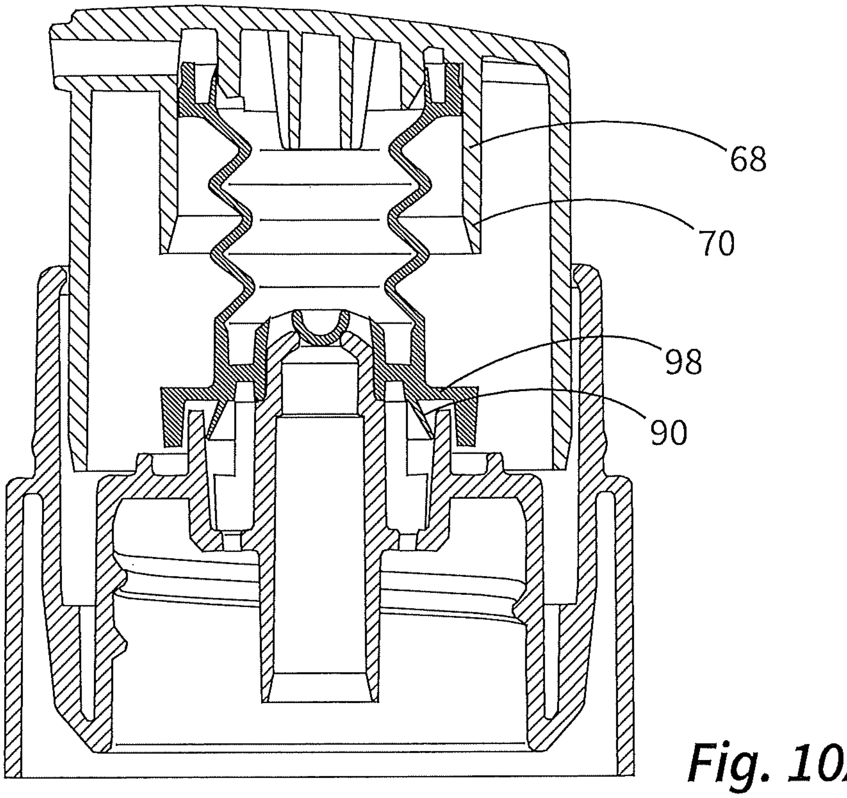
FIGS. 10A and 10B show a second variant of a discharge head, in the non-actuated and actuated state.
Figure 10B:
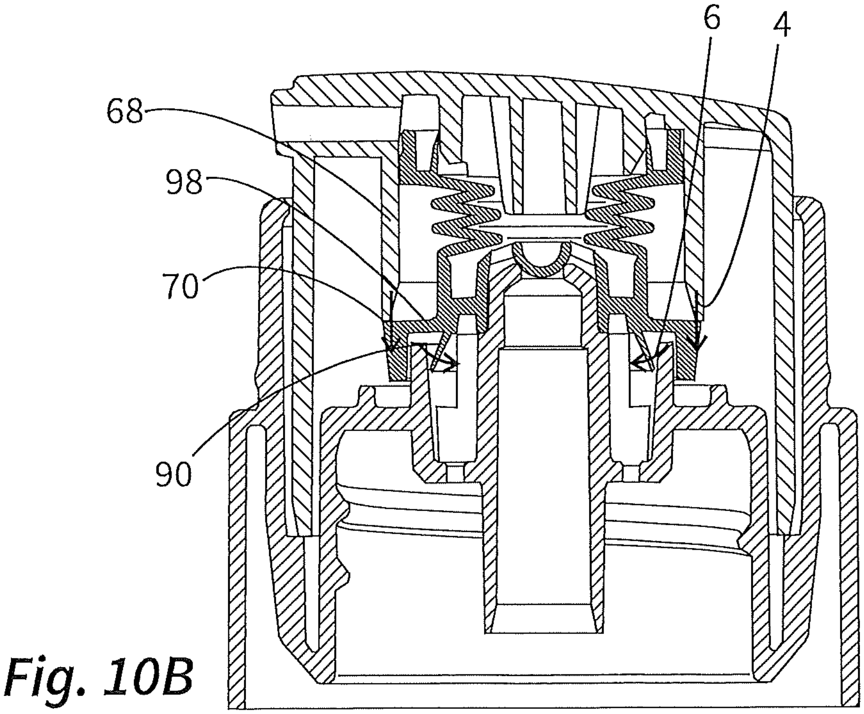

FIGS. 10A and 10B show a second embodiment of a discharge head 10 according to an embodiment of the invention. The head 10 of FIGS. 10A and 10B is constructed in a substantially identical manner to the embodiment above with the exception of the detail set out below. The only difference is that the securing web 68, to the inner side of which the upper end of the pump chamber component 80 is secured, already extends in the idle state of FIG. 10A significantly further in the direction of the lower end of the pump chamber component 80.

This construction is selected so that an end face which terminates the securing web 68 at the lower end can act as a switching face 70 which, when the push actuator 50 is pressed down, forcibly opens the ventilation valve 18 or at least reduces the pressing force of the contact face 94 of the valve lip 90 on the valve face 44 in such a manner that the opening of the ventilation valve 18 can be ensured for the purposes of producing the pressure compensation.

FIG. 10B shows this effect. In FIG. 10B, the lower end position of the push actuator 50 is illustrated. In this lower end position, the switching face 70 presses externally on a tilting collar 98 which at the same time is a carrier of the above-described protective lip 96. The arrows 5 illustrate this. The deformation of the tilting collar 98 which is thereby brought about leads to the valve lip 90 which is fitted at the inner end of this tilting collar 98 being released from the valve face 44. The arrows 6 illustrate this. This opening functions particularly well when, in a manner corresponding to the previous embodiment and in particular FIG. 5 therein, the ribs 39 with their respective support faces 38 are provided.

If the push actuator is pressed into its lower end position, therefore, the ventilation valve 18 is thereby opened. Should a reduced pressure still remain in the liquid store 110 from a previous actuation, therefore, this is equalized at this time. Although reduced pressure is produced again in the liquid store during the return stroke of the push actuator 50, this is not sufficient to prevent a suction of liquid into the pump chamber 13 during the return stroke. During the subsequent next actuation, the reduced pressure in the liquid store is equalized once more.

The invention claimed is:

1. A discharge head for a liquid dispenser for dispensing pharmaceutical liquids or cosmetic liquids, the discharge head comprising:

a base and a push actuator which can be pressed down with respect to the base between an unactuated end position and an actuated end position in an actuation direction;

a liquid inlet for connection to a liquid store and a discharge opening for discharging liquid in an environment; and a pump device which comprises a deformable pump chamber component which is open at both sides and which is secured to the base and to the push actuator and which surrounds a pump chamber being variable in terms of volume and which has an inlet valve and an outlet valve;

the outlet valve having a peripheral annular web which projects downward from an inner end wall of the push actuator in a direction of the base, the outlet valve having an outer side forming a circumferential valve face; and a displacement structure at an inner side of the annular web, the displacement structure protruding downward from an inner end face of the push actuator, wherein the displacement structure has a receiving space which is open in a direction of the pump chamber and which is laterally closed by a surrounding wall;

the pump chamber having a maximum volume which is defined by an inner space of the pump chamber between the inlet valve and the outlet valve when the push actuator is arranged in the unactuated end position;

the receiving space having a receiving space volume which is formed by a part-volume of the pump chamber which is enclosed within the surrounding wall; and a relationship between the receiving space volume and the maximum volume is between 1:50 and 1:10.

2. The discharge head as claimed in claim 1, wherein: the surrounding wall extends in a manner protruding over the annular web into the pump chamber.

3. The discharge head as claimed in claim 1, wherein: the displacement structure has a cross section orthogonally with respect to the actuation direction which is smaller than a clear cross section of the pump chamber component.

4. A discharge head for a liquid dispenser for dispensing pharmaceutical liquids or cosmetic liquids, the discharge head comprising:

a base and a push actuator which can be pressed down with respect to the base between an unactuated end position and an actuated end position in an actuation direction;

a liquid inlet for connection to a liquid store and a discharge opening for discharging liquid in an environment;

a pump device which comprises a deformable pump chamber component which is open at both sides and which is secured to the base and to the push actuator and which surrounds a pump chamber being variable in terms of volume and which has an inlet valve and an outlet valve;

at least one ventilation opening which extends through the base and which is associated with a ventilation valve;

the ventilation valve having a peripheral valve lip which is formed integrally on the deformable pump chamber component and which includes an outer side that abuts in a state pretensioned in an outward direction against an inner side of a peripheral valve web of the base; and a protective lip which is also formed integrally on the deformable pump chamber component and which is arranged at the outer side of the valve lip in order to protect the valve lip prior to installation in the discharge head.

5. The discharge head as claimed in claim 4, wherein: the protective lip protrudes beyond the valve lip both radially and axially.

6. A discharge head for a liquid dispenser for dispensing pharmaceutical liquids or cosmetic liquids, the discharge head comprising:

a base and a push actuator which can be pressed down with respect to the base between an unactuated end position and an actuated end position in an actuation direction;

a liquid inlet for connection to a liquid store and a discharge opening for discharging liquid in an environment;

a pump device which comprises a deformable pump chamber component which is open at both sides and which is secured to the base and to the push actuator and which surrounds a pump chamber being variable in terms of volume and which has an inlet valve and an outlet valve;

at least one ventilation opening which extends through the base and which is associated with a ventilation valve;

the ventilation valve having a peripheral valve lip which is formed integrally on the deformable pump chamber component and which abuts in a state pretensioned in an outward direction against a peripheral valve web of the base;

a tilting member which protrudes radially over the peripheral valve lip and which is formed integrally on the pump chamber component; and a switching face provided on the push actuator and which faces in a direction of the tilting member and which in the actuated end position acts with force on the tilting member and thereby lifts the valve lip of the ventilation valve from the valve web or facilitates pressure-related lifting of the valve lip from the valve web.

7. The liquid dispenser as claimed in claim 3, wherein the cross section of the displacement structure is smaller than an inner diameter of a bellows region of the pump chamber component.

* * * * *